July 8, 1924.

C. HOLZENDORF 1,500,492

AUTOMATICALLY CONTROLLED VENTILATOR OR FAN

Filed Oct. 22, 1923

INVENTOR
Charles Holzendorf
BY
Max N. Ordmany
ATTORNEY

Patented July 8, 1924.

1,500,492

UNITED STATES PATENT OFFICE.

CHARLES HOLZENDORF, OF NEW YORK, N. Y.

AUTOMATICALLY-CONTROLLED VENTILATOR OR FAN.

Application filed October 22, 1923. Serial No. 669,896.

*To all whom it may concern:*

Be it known that I, CHARLES HOLZENDORF, a citizen of the United States, residing at New York, in the county of New York and State of New York, have invented certain new and useful Improvements in Automatically-Controlled Ventilators or Fans, of which the following is a specification.

This invention relates to ventilators or fans and has for its object to provide a simple and comparatively cheap construction of a fan, which will be set in motion and stop automatically either at predetermined times or through the change of temperature.

Figure 1:
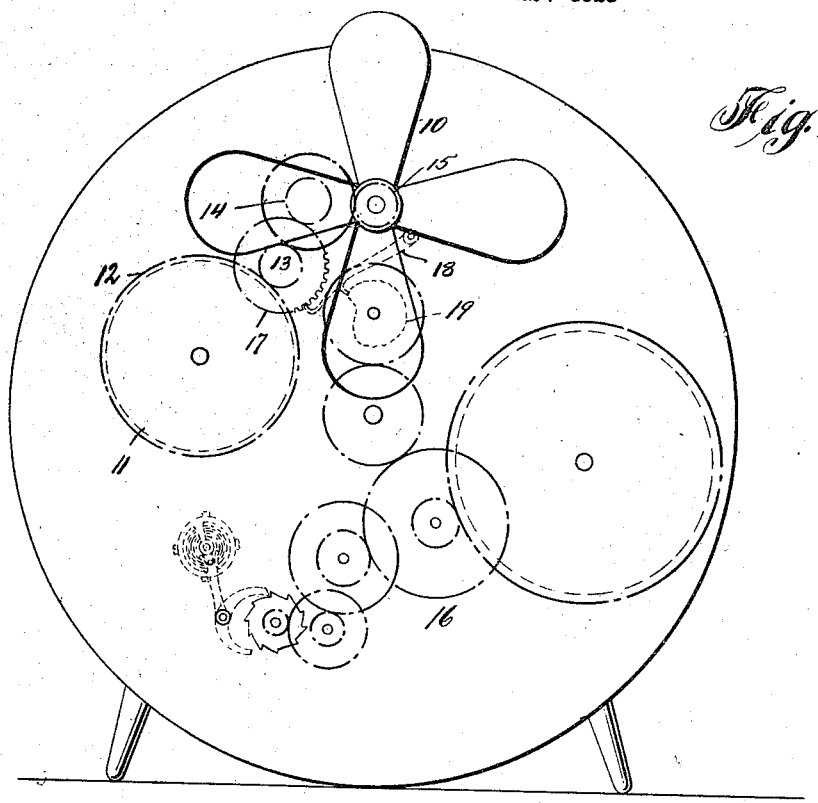
Figure 2:
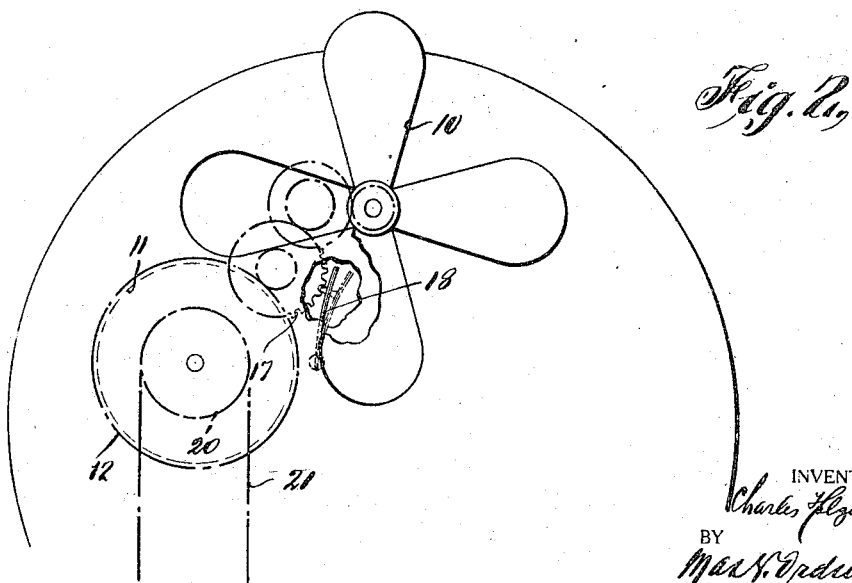

In the accompanying drawing, two embodiments of my invention are shown more or less diagrammatically, Fig. 1 being an elevation of a clock operated and time controlled fan and Fig. 2 a similar view of a thermostatically controlled fan.

10 denotes a fan of ordinary construction operated by means of a spring 11 through a chain of gears 12, 13, 14 and 15.

The operation of the fan by the spring 11 is controlled through the usual alarm control of a clock mechanism 16 through the medium of a ratchet wheel 17 cooperating with a pawl 18 actuated by a cam 19. By this mechanism, the fan can be set to commence its operation at a certain hour of the day or night.

In the modification shown in Fig. 2, the operation of the spring 11 is controlled through a thermostatic pawl 18' cooperating with the ratchet wheel 17, so that the fan will be set in operation or stop automatically, when the temperature in the room rises above or drops below a certain degree.

The fan is principally designed for use in small households and farm houses not supplied with electricity.

In order to facilitate the winding of the spring 11 when the fan is arranged at an elevation, I provide a sprocket wheel 20 suitably connected to the spring and over which is mounted an endless sprocket chain 21 extending down to a point, where it can be easily reached from the floor (Fig. 2).

What I claim is:—

In a fan, the combination with its spindle, of a spring operated clock mechanism operating said spindle, and a motion control mechanism comprising a wheel and a thermostatic stop cooperating with said wheel, to release or arrest the same according to the temperature influencing said stop.

In testimony whereof I affix my signature in presence of two witnesses.

CHARLES HOLZENDORF.

Witnesses:
  VIRGINIA W. FALLER,
  JOSEPH T. MCMAHON.